United States Patent [19]

Murphy et al.

[11] Patent Number: 4,464,413

[45] Date of Patent: Aug. 7, 1984

[54] METHOD AND APPARATUS FOR PRODUCING CRYOGENIC TARGETS

[75] Inventors: James T. Murphy, Los Alamos, N. Mex.; John R. Miller, Penfield, N.Y.

[73] Assignee: The United States of America as represented by the United States Department of Energy, Washington, D.C.

[21] Appl. No.: 297,477

[22] Filed: Aug. 28, 1981

[51] Int. Cl.$^3$ .............................................. G21C 3/06
[52] U.S. Cl. ..................................... 427/6; 118/725; 118/716; 219/121 LM; 219/121 L; 376/152
[58] Field of Search .................. 219/121 LI, 121 LK, 219/121 LM; 118/725, 716; 427/6; 376/151, 152

[56] References Cited

U.S. PATENT DOCUMENTS

| 3,916,143 | 10/1975 | Farrel | 219/121 LM |
| 4,154,868 | 5/1979 | Woerner | 427/6 |
| 4,266,506 | 5/1981 | Miller | 427/6 |

*Primary Examiner*—Sam Silverberg
*Attorney, Agent, or Firm*—Lee W. Huffman; Paul D. Gaetjens; Michael F. Esposito

[57] ABSTRACT

An improved method and apparatus are given for producing cryogenic inertially driven fusion targets in the fast isothermal freezing (FIF) method. Improved coupling efficiency and greater availability of volume near the target for diagnostic purposes and for fusion driver beam propagation result. Other embodiments include a new electrical switch and a new explosive detonator, all embodiments making use of a purposeful heating by means of optical fibers.

11 Claims, 6 Drawing Figures

METHOD AND APPARATUS FOR PRODUCING CRYOGENIC TARGETS

BACKGROUND OF THE INVENTION

The present invention relates generally to a cryogenic method and apparatus and relates more particularly to an improved method and apparatus for producing inertially driven fusion targets. The invention is a result of a contract with the Department of Energy (Contract No. W-7405-ENG-36).

An important problem in the development of controlled thermonuclear fusion as a source of energy was how to produce cryogenically fueled fusion targets having a uniform solid layer of material such as deuterium tritium (DT). Difficulties in such production arose from the small size of the fuel core, the adverse effects of gravity, and the strong influence played by surface (rather than by bulk) properties of DT. However, such solid fueled targets have been an essential part of fusion research; and they were finally achieved by the process disclosed in U.S. Pat. No. 4,266,506 to John R. Miller, "Apparatus for Producing Cryogenic Inertially Driven Fusion Targets." Prior to that invention, uniform, solid fuel layers on target surfaces had not been produced. That invention uses the fast isothermal freezing (i.e., FIF) method, which requires rapid uniform cooling of the target fuel from the gaseous to the solid state. The target is placed in an isothermal environment at about 6 K. and heat is locally applied to the target to vaporize all the fuel. The heat is then removed, causing the target fuel to cool rapidly through its triple point (19.7 K.) and to form a uniform, solid fuel shell. In U.S. Pat. No. 4,266,506 local heating was applied with a tightly focused laser beam onto a target that was supported on a glass stalk, glass fiber, or polymer fiber. However, when the method and apparatus of that patent are used, the laser focusing part of the apparatus which requires a lens takes up much volume outside the cryogenic shroud close to the target which might otherwise be used for diagnostic purposes or propagation of the laser or particle fusion driver beams. Furthermore, some laser light is lost due to reflection in using the method and apparatus; and thus the coupling efficiency of light energy to the target is diminished. Thus, improvements in the method and apparatus of that patent were sought.

SUMMARY OF THE INVENTION

Objects of this invention are a method and apparatus for producing FIF targets suitable for use in inertial fusion work, wherein a greater coupling efficiency is provided than has previously been possible. And, thus, a smaller power source can be used to supply a given level of power to the target than has heretofore been possible.

Other objects of this invention are a method and apparatus for producing such targets, the method and apparatus requiring fewer and less complicated optical components near the target so that more volume close to the target is free from obstructions than has been possible in the prior art, thus providing a greater capability for doing diagnostic tests in the space surrounding the target, providing greater space for propagating the fusion driver beams which drive the target implosion, and reducing the material mass near the target (which is important for reducing neutron and x-ray activation problems).

Further objects of this invention are a commercially viable method and apparatus for producing ten targets per second, a production rate which has been thought to be required for the operation of an inertial fusion reactor.

Other objects of this invention are a method and apparatus for producing cryogenically fueled multishell FIF targets.

Another object of this invention is a method of heating a cryogenic object locally, without significantly disrupting the general environment.

Another object of this invention is a method of accurately measuring the time response of various electrical, mechanical, thermodynamical, and transport properties of materials (without significantly disturbing the surrounding environment).

Yet another object of this invention is an improved electrical switch.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the method of this invention for producing inertial fusion targets by using the basic technique of fast isothermal freezing comprises: (a) mounting a target (which is a glass, metal, or polymer microballoon filled with or surrounded by one or more coating materials of various atomic numbers) onto one end of an optical fiber (or an equivalent thereof); (b) applying a light source to the opposite end of the optical fiber (or equivalent thereof) so as to heat efficiently the target to a temperature at which the fuel is gaseous; and (c) terminating the light source so as to cause the fuel to uniformly condense and solidify in or on the target.

In a preferred embodiment, a laser diode is used as the light source, this use being possible due to the high coupling efficiency which is obtained by use of the optical fiber to transmit light energy into the target which is converted to heat upon deposition.

The present invention also comprises, in accordance with its objects and purposes, a method of transmitting heat to a cryogenic body so as to minimally disturb the surrounding environment, the method comprising: using an optical fiber as a means for transmitting heat to the body.

The present invention also comprises, in accordance with its objects and purposes, an apparatus suitable for producing inertial fusion targets employing the fast isothermal freezing method which comprises: (a) a cryogenic shroud and (b) an optical fiber (or an equivalent thereof) onto one end of which an inertial fusion target is to be mounted within the cryogenic shroud, the opposite end of the optical fiber (or equivalent) extending outside the cryogenic shroud.

In one embodiment of the apparatus of the invention, a laser is directed at and coupled to the end of the optical fiber which is located outside the cryogenic shroud, supplying heat to a glass microballoon located within the shroud. In another embodiment, a laser diode is used to provide the light which is transferred via the optical fiber to the target for the purpose of heating the target.

Using the invention method of transmitting heat by use of an optical fiber for the specific purpose of producing inertial fusion targets by the fast isothermal freezing method, the objects listed above are satisfied and several advantages result which were not obtained in the method and apparatus disclosed in U.S. Pat. No. 4,266,506. A greater percentage of the light for processing is absorbed by the target in this apparatus than was possible in the earlier patent, thus providing a greater coupling efficiency in this apparatus. And because of this greater coupling efficiency, less power can be used here to produce a given amount of heating than was needed in the earlier patent. And, because of the lower power requirements, it then should be possible to use a laser diode (which is physically much smaller than a gas laser or a flash lamp pumped laser previously used) to produce the power. Yet another advantage is that more volume around the target immediately outside the cryogenic shroud is freed for propagation of the inertial fusion driver energy and is available for diagnostic tests than was possible in the earlier patent. Here no separate lens with associated fixturing hardware is used for focusing the laser light used for heating, and direct access for the laser light is not here required (the optical fiber being bendable). Thus, the source of laser light can be located wherever it is convenient; and no windows are required for light access. Furthermore, the reduction in the material mass near the target will be important for reducing neutron and x-ray activation problems.

Although optical fibers have been used to transmit light in the prior art for purposes of transmitting information and although it is believed that they have been used in laser knives, it is believed that an optical fiber has not previously been used specifically for the purpose of transferring heat (or power) to a well-defined local area in a cryogenic environment, without perturbing the general environment.

It is believed that the use of optical fibers solely for the purpose of local heating in a cryogenic environment is not obvious because the fibers have long existed without having been used for this purpose.

And, particularly, it is believed that an optical fiber has not been used for the purpose of transferring heat to an object located within a cryogenic environment and especially not where the object is an inertial fusion target. The use of optical fibers in producing cryogenic targets in the fast isothermal freezing method is believed to be unobvious because of the advantages (described above) which result when an optical fiber specifically is used as the means of transmitting heat into the target located within the cryogenic shroud. Also, in the past, there has been a reluctance to penetrate cryogenic shields with mechanical structures due to possible heat leaks into the shields. Furthermore, other new uses (described below) of the laser and optical fiber combination are believed to be new and unobvious. These include the switch (shown in FIG. 6).

BRIEF DESCRIPTION OF THE DRAWINGS

The accompanying drawings, which are incorporated in and form a part of the specification, illustrate various embodiments of the present invention and, together with the description, serve to explain the principles of the invention. In the drawings.

Figure 3:
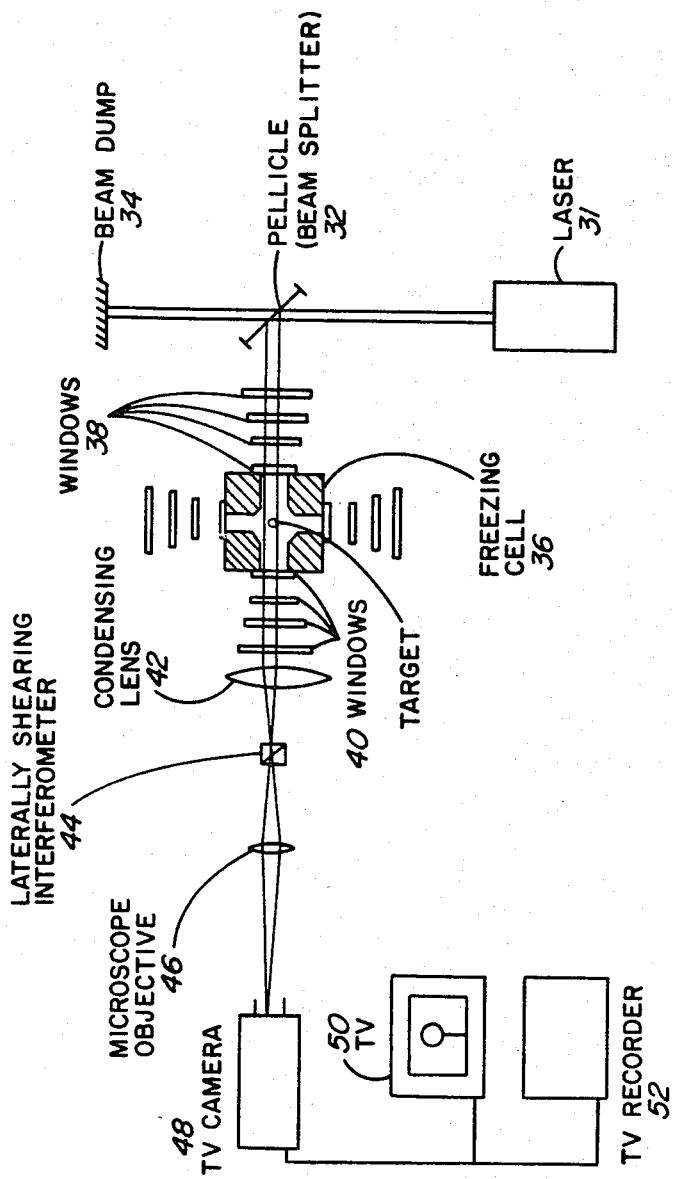

Shown in FIG. 3 is apparatus which can be used to check the uniformity of the DT layer on or within FIF targets. The optical fiber (not shown) which is used for heating would extend outside the cryogenic shroud and would be there coupled with a laser or laser diode.

Figure 4:
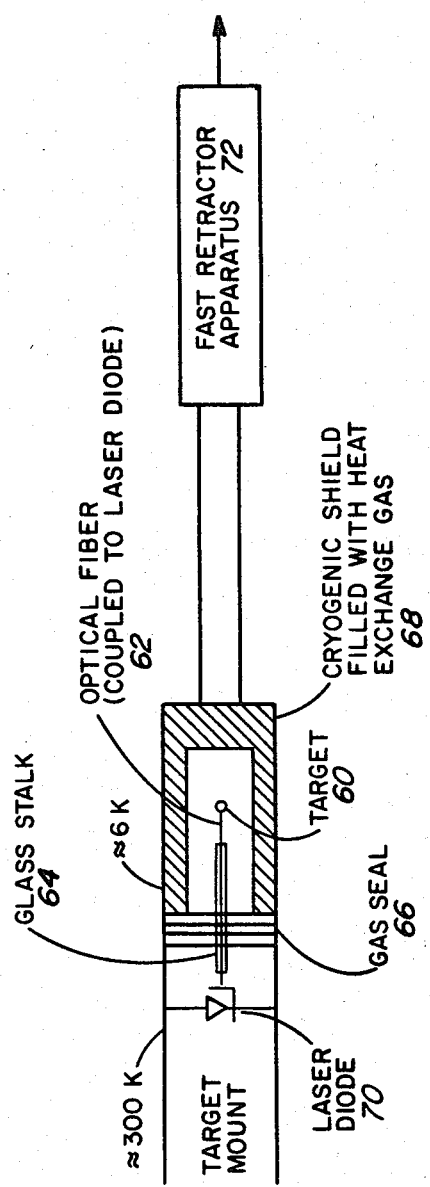

In FIG. 4, a preferred embodiment showing use of a laser diode in conjunction with an optical fiber is shown. The optical fiber extends outside the cryogenic shroud.

Figure 5:
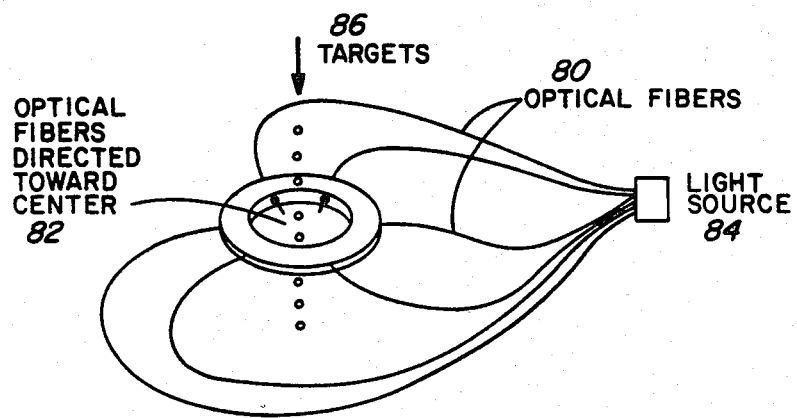

In FIG. 5, an embodiment suitable for producing at least ten targets per second is diagrammatically illustrated.

Figure 6:
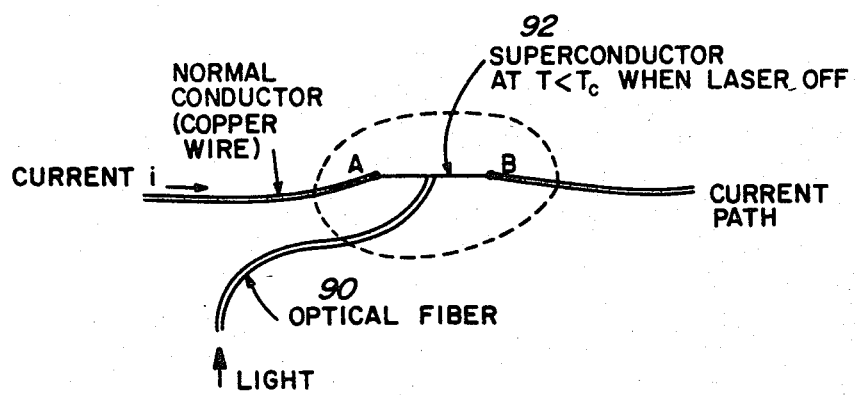

In FIG. 6, is shown an electrical switch according to the invention which employs an optical fiber for transmitting heat.

DESCRIPTION OF THE PREFERRED EMBODIMENTS

In the practice of the invention, an optical fiber (or equivalent thereof) is used to produce local heating in a cryogenic environment. In a preferred embodiment inertial fusion targets are heated in a fast isothermal freezing chamber by using an optical fiber for heat conduction. A short pulse of light of sufficient power to vaporize the fuel is applied, and then the target is allowed to cool, using the FIF method. The FIF method is fully disclosed in U.S. Pat. No. 4,266,506; and that patent is hereby incorporated herein by reference. In the following, an optical fiber is defined to be a long flexible fiber of transparent material such as glass or plastic which by a series of internal reflections transmits light. An equivalent thereof is an optical waveguide which is a system of materials designed to confine and direct electromagnetic waves in a direction determined by its physical boundaries.

Figure 1:
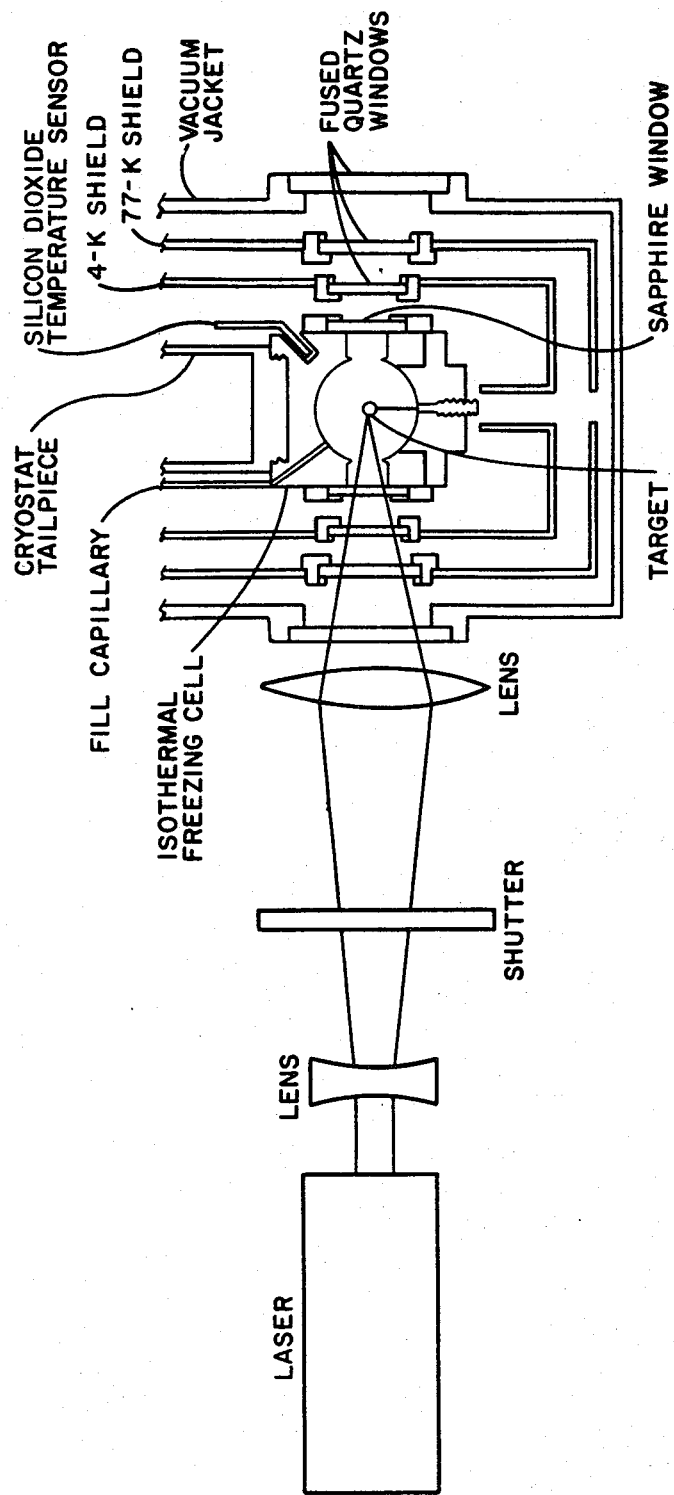
In FIG. 1, the apparatus of U.S. Pat. No. 4,266,506 (referred to above) is schematically illustrated, the target being housed by the cryogenic shield and being heated by a lens-focused laser.

Referring to the drawing, in FIG. 1 is shown the experimental apparatus which was disclosed in U.S. Pat. No. 4,266,506. From FIG. 1, it can clearly be seen that much apparatus was there used in the space outside the cryogenic shroud located very close to the target. This apparatus includes a large converging lens for focusing the laser light, a shutter, a diverging lens for initial beam expansion, and the laser itself.

EXPERIMENTAL DEMONSTRATIONS

Figure 2:
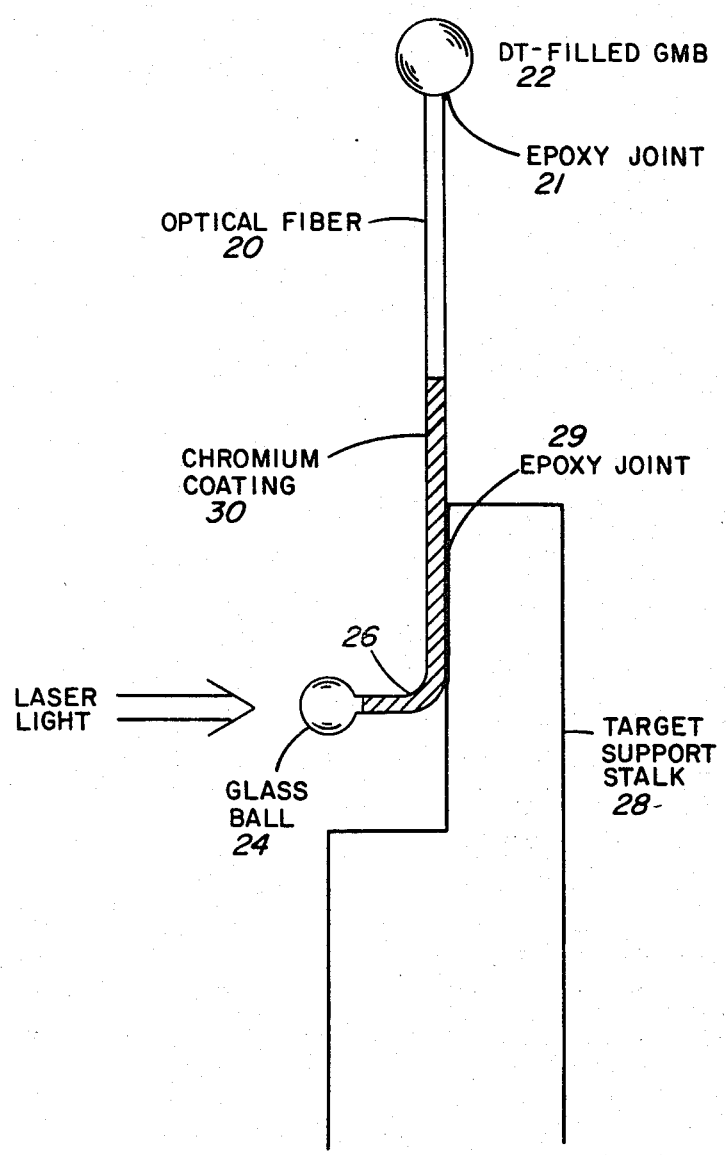
In FIG. 2, a schematic illustration of an assembled target of the present invention is shown, positioned at one end of an optical fiber which conducts light into the target for heating.

In FIG. 2, apparatus is shown which was used in experimental demonstrations of the present invention to show operability of conducting heat by use of an optical fiber to each of several cryogenic targets. An optical fiber 20 is fastened at one end at an epoxy joint 21 by means of a type of epoxy glue to a DT-filled glass microballoon 22. The opposite end of the optical fiber had been formed into a glass ball 24 by melting the fiber in a flame as described by R. E. Parks and R. E. Sumner, Applied Optics, Vol. 17, no. 16, p. 2469 (1978). This paper is hereby incorporated herein by reference. The ball 24 acts as a condensing lens to focus the incident light into the fiber. The fiber was then bent at about a 90° angle 26 at about 2 millimeters from the ball 24 by softening the fiber on a hot wire. A target support stalk 28 which was made of glass was used to support the optical fiber 20. However, it was found that when epoxy alone was used to fasten the optical fiber to the support stalk 28 at epoxy joint 29, light losses occurred in the epoxy joint. To eliminate or reduce these losses, a reflective coating was first placed on the portion of the optical fiber which was to be epoxied to the target support stalk. This was done by the following procedure. The ball was embedded in a polyvinyl acetate resin which was Vinylite AYAC so as to leave the remainder of the fiber exposed. A highly reflective coating of chromium 30 was then evaporated onto the portion of the fiber which was to be epoxied onto the target support stalk 28. It was found that chromium is tough enough to withstand handling during mounting and thus was the preferred coating material. No such reflective coating was applied to either end of the optical fiber. After removing the glass ball from the AYAC, the fiber was cleaned in acetone and mounted to the target stalk (which was 1 mm in diameter) using Hardman five-minute epoxy glue. Then, the DT-filled target was mounted to the end of the optical fiber using the same type of epoxy. After about 30 minutes, the structure was submerged in liquid nitrogen at a temperature of about 77 K. to test the epoxy joints.

Then, the entire structure shown in FIG. 2 was inserted into the apparatus shown in FIG. 1, although this is not the preferred arrangement of the invention, which is described below in FIG. 4, where the laser-heated end of the optical fiber extends outside the cryogenic shroud.

Two targets, targets 1 and 2 summarized in the Table below, were processed by focusing the light energy onto the glass ball 24 on the end of the optical fiber 20. The processing power is given in the Table. Because of damage to the glass balls 24, targets 3 and 4 were processed by focusing the light energy onto the optical fiber at an angle perpendicular to the axis of the fiber. Because of the use of this unconventional method of coupling, the processing power was not obtained for targets 3 and 4. The diameter, wall thickness, and fill pressure of each target are given in the Table.

The coupling efficiency of target 1 (processed by the method of this invention) was compared with a similar sized target prepared by the method disclosed in U.S. Pat. No. 4,266,506. The optical fiber and laser combination of this invention resulted in a 30% increase in coupling efficiency over the method of U.S. Pat. No. 4,266,506.

Each target was then observed interferometrically, using the apparatus shown in FIG. 3, so as to determine the uniformity of the frozen fuel layer of DT. This procedure was done immediately after each individual target was processed, while it was located within the freezing cell. Light from laser 31 is directed at pellicle 32 (which is a beam splitter). Part of the split beam proceeds into a beam dump 34 (and is not used); and the other part of the beam proceeds directly into freezing cell 36 through windows 38. The beam of light then exits the freezing cell via windows 40 and then enters condensing lens 42, then the laterally shearing interferometer 44, then the microscope objective 46, and finally the television camera 48. Television camera 48 is connected to television 50 and television recorder 52. Then, using the interferogram transparencies which are obtained by tv recorder 52, and overlaying the transparencies, as is disclosed in J. T. Murphy and J. R. Miller, "Improved Cryogenic-Target-Production Technique," J. Vac. Sci. Technol., Vol. 18, no. 3, pp. 1286-1287 (April 1981), the uniformity of the frozen fuel layer was measured. That reference is hereby incorporated herein by reference.

The freezing cell temperature in all runs was about 4.6 K. In runs 1, 3, and 4, uniform layers of fuel were obtained by using one method of the invention, wherein an optical fiber transmits heat into the target. However, in run no. 2, the fuel could not be completely vaporized either by using the optical fiber technique of the present invention or by using the technique illustrated in FIG. 1. It is believed that if sufficient laser power had been used, the optical fiber technique of the present invention would have provided a uniform layer in this target, as was obtained in the other runs which were tried.

In FIG. 4, an embodiment (not yet built) of the invention suitable for use in a fusion target chamber which illustrates various preferred aspects of the invention is shown. Target 60 is attached by means of epoxy glue (not shown) to optical fiber 62, which is supported within glass stalk 64. Both the optical fiber 62 and the glass stalk 64 extend through gas seal 66, which was invented by Gene Stewart and developed by workers at the National Bureau of Standards. A description of the seal appears in Los Alamos Report LA-UR-79-2415, "Helios Cryogenic-Target Producing Apparatus," J. R. Miller et al.; and that paper is hereby incorporated herein by reference. The gas seal 66 is used to seal a portion of cryogenic shield 68, which is maintained at a temperature of about 6 K. The gas seal 66 has fifty layers, which are schematically shown and which serve to prevent exchange gas which is located within cryogenic shield 68 from escaping from the shield. If desired, only the optical fiber 62 can penetrate the cryogenic shield 68, and the glass stalk 64 can be attached to the inner side of the gas seal 66. The end of the optical fiber 62 which is located outside the cryogenic shield is coupled to a source of laser light. In FIG. 4, that source is a laser diode 70. However, if desired, instead of laser diode 70, a laser can be coupled to the end of the optical fiber 62 which is at room temperature (about 300 K.). The laser or laser diode is coupled to the optical fiber by any suitable means such as a low loss commercial connector.

TABLE

| Target No. | Target Diameter (μm) | Target Wall Thickness (μm) | Target DT Fill Pressure (atm) | Laser Processing Power* (mW) | Optical Fiber Diameter (μm) | Results |
| --- | --- | --- | --- | --- | --- | --- |
| 1 | 178 | 4.96 | 60 | 10.2 | 60 | Uniform layer |
| 2 | 286 | 1.13 | 30 | 12.7 | 60 | Target was damaged and fuel was lost |
| 3 | 187 | 3.34 | 60 | — | 45 | Uniform layer |
| 4 | 198 | 4.67 | 60 | — | 45 | Uniform layer |

*Power entering target, as estimated by subtracting the light loss at each surface that the light passed through after it left the laser source.

The cryogenic shield 68 is filled with an exchange gas such as helium. Preferably, when the apparatus is used for certain purposes, the cryogenic shield 68 will be attached to a fast retractor apparatus 72 which will quickly remove the shield 68 so as to expose target 60 to the inertial fusion driver beams. Because the frozen fuel layer will melt within a time period of several milliseconds, the fast retractor must be capable of removing shield 68 from the vicinity of the target within that same period of time when the target 60 is to be used for a purpose requiring the uniform frozen layer of fuel to be presented to the driver beams.

In the operation of the apparatus shown in FIG. 4, a short pulse of light of sufficient power to vaporize the fuel will be applied, and then the target will be allowed to cool, using the fast isothermal freezing technique which was described in U.S. Pat. No. 4,266,506, described above.

In FIG. 5, a multiplicity of optical fibers 80 are connected at one end to a ring 82 used for supporting the fibers so that light conducted by the optical fibers will pass into a sufficiently small spatial volume in the center of the ring 82 so that substantially all of said optical fibers will simultaneously heat the same individual target. The remaining end of each optical fiber is coupled to a light source 84, which is preferably a source of coherent light or more preferably a laser diode. A plurality of targets 86 which are to be processed at a rate of at least 10 per second are then allowed to pass through the small volume at the center of the ring. There, the fuel quickly vaporizes. Then the fuel condenses and freezes in a uniform layer on or within each target as it continues its passage. If desired, a multiplicity of such rings arranged in a cylinder can be used.

Although a ring is preferred as the geometrical configuration through which the targets 86 are fed, other geometrical arrangements are also possible, provided that the light emitted from the ends of the optical fibers 80 is aimed at a point and provided that the targets then pass through that point.

In FIG. 6 is shown a use of the method of the invention whereby laser light conducted through an optical fiber 90 is used to heat a superconducting material (generally at a cryogenic temperature) 92 so as to provide an electrical switch. The superconductor 92 will be maintained at a temperature less than its critical temperature $T_C$ by a cooling means (not shown) when the laser is off. Additionally, the temperature of the larger environment will also be maintained at a temperature less than the superconducting temperature $T_C$. This switch can be part of any suitable circuit. For example, superconductor 92 can be connected to a conductor (for example a copper wire) at points A and B. When the laser or other light source is off, points A and B are at the same voltage because the current can flow through the superconductor with virtually no resistance. When local heating is applied by turning on the laser or other light source, a voltage drop results because the superconductor is raised above its superconducting transition temperature. This switch will have the following advantages. It should operate very quickly because the time constant of the transition from the normal state to the superconducting state is much less than 1 picosecond. Another advantage is that the electrical switch described above will have low energy loss due to the nature of its operation.

The switch is expected to be useful as part of a compact high-speed computer because the switch can be made into a logic circuit by requiring two or more fibers to be energized for opening the switch. The switch can also be used as part of a high power, low loss amplifier since a very a small amount of light energy can control a large current flow.

In the practice of the invention, at least one optical fiber (or an equivalent thereof which has a small mass so that effects on the environment will be minimized and which has a low light loss) is placed in close proximity to a body in a cryogenic environment; and light is directed through the optical fiber into or onto the body so as to heat that body locally. The length and diameter of the optical fiber can be chosen as desired within the constraints of the optical fibers. The optical fiber can be attached to the body being heated, if desired, for example by use of epoxy.

Laser light will be coupled into the end of the optical fiber opposite the body being heated by any means which provides a high coupling efficiency between the optical fiber and either a laser or a laser diode which is used to supply the light.

The light must be of sufficient power to achieve the heating which is desired. If a laser diode is used to provide a power level greater than 10-20 mW (as was used to process the targets in the experimental demonstrations described above), if needed a multiplicity of laser diodes and optical fibers can be stacked to achieve a higher power level.

If the length of the optical fiber which is used is quite long, a support for the optical fiber will generally be used. And if epoxy is placed in contact with the optical fiber at any point except at either end, the fiber should have a reflective coating placed onto the fiber before the epoxy is used. Also, under other circumstances where light may be lost at some point along the optical fiber, the fiber should have a reflective coating.

Using the method of the invention, inertial fusion targets having single or multiple shells can be processed using the FIF technique to form a cryogenic fuel layer or layers by conducting heat into or onto the target via an optical fiber. Generally, for this processing, optically transparent windows in the cryogenic shield will not be required. Additionally, the coupling efficiency will be high and, thus, less power can be used to achieve the same amount of heating than was used in U.S. Pat. No. 4,266,506. Therefore, a laser diode can be used instead of a gas laser or optically pumped laser; and this will cut down on the cost since laser diodes are significantly less expensive than lasers.

Laser diodes with suitable power and energy for processing targets for use in this invention are commercially available. A suitable example is the 7.5 mW continuous wave laser diode having type no. SCW20 which can be purchased from Laser Diode Laboratories, Inc.

Besides the utility of the method of the invention for processing cryogenic inertial fusion targets (as described in the discussion of FIGS. 1 through 5 above) and the application of the invention in a new type of switch (as shown in FIG. 6), the invention can also be used for heating in the following applications. Measurement of material properties (e.g., thermodynamic, electrical, and mechanical) can be studied using the method of the invention, and several advantages result. The dynamic thermal response of a system is measured by adding energy to the system and measuring the resultant temperature rise. Prior art approaches have relied on using a resistance heater; however, this approach does not give good results when only small samples are available because the heater dominates the time response. On the other hand, using an optical fiber to introduce energy into the system will only minimally add to the sample response because an optical fiber having a diameter on the order of 5 to 10 micrometers has a very small mass, heat capacity, and thermal conductivity. Therefore, the optical fiber will not greatly perturb the system being studied. And these considerations are especially important for all cryogenic property measurements. The only requirement is that the heating be such that the temperature of the optical fiber not exceed its melting point (about 1,300 K.).

Another application of the invention involves a chemical aspect. Light conducted through the fiber can be used to cause local heating and thus initiate a chemical reaction. For example, an explosive can be set off by this means, rather than by using an electrical blasting cap or primer fuse. Thus, the explosive will not be susceptible to electrical interference or shock, and no open combustion is needed.

A mechanical application of the invention is to apply energy via an optical fiber onto a bimetallic strip, and the strip can then be used to operate a mechanical system or to open or close a separate electrical switch. This can provide, therefore, a device which moves without electrical or mechanical linkage.

The foregoing description of preferred embodiments of the invention has been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular uses contemplated. It is intended that the scope of the invention be defined by the claims appended hereto.

What is claimed is:

1. In a method of producing at least one fuel-coated inertially driven cryogenic neutron generating microballoon target within a cryogenic region, using the fast isothermal freezing method, the method comprising: conducting heat to said at least one target by means of light which passes through an optical fiber having a first end and a second end, said second end of said optical fiber being located within said cryogenic region and positioned so that said second end is in close proximity to said target and so that light exiting from said second end contacts said target but only minimally disturbs said cryogenic region.

2. A method according to claim 1, wherein said second end of said optical fiber is attached to said target.

3. A method according to claim 2, wherein said second end of said optical fiber is located outside said cryogenic region.

4. An improved apparatus having no optical windows for producing fuel-coated inertially driven neutron generating microballoon targets using the fast isothermal freezing method, said apparatus comprising:
   (a) a source of coherent light for melting the fuel within the target;
   (b) a cryogenic shroud having a multi-layered gas seal; and
   (c) an optical fiber having a first end and a second end and penetrating said shroud, said second end of said fiber being located within said shroud and to which a target is to be placed in close proximity and said first end of said optical fiber is to be coupled to said source of light.

5. An apparatus according to claim 4, wherein said source of coherent light is a laser.

6. An apparatus according to claim 4 wherein said source of coherent light is a laser diode.

7. An apparatus according to claim 5 or 6, and including also a shutter means for automatically disconnecting said source of coherent light from said optical fiber.

8. An apparatus according to claim 7, wherein said cryogenic shroud can be retracted.

9. An apparatus according to claim 8, and including also an inertial neutron generating driver.

10. An apparatus for producing cryogenic fuel-coated microballoon neutron generating targets in the fast isothermal freezing method, said apparatus comprising:
   a plurality of optical fibers each having a first end to be coupled to laser light and each having a second end arranged with other second ends in a geometric configuration so that light exiting from the second ends thereof will be directed at a sufficiently small spatial volume so that a multiplicity of cryogenic targets can be quickly passed through said sufficiently small spatial volume and so that substantially all of said optical fibers will simultaneously heat the same target therein.

11. An apparatus according to claim 10, wherein said geometric configuration is at least one ring.

* * * * *